United States Patent

[11] 3,587,852

| [72] | Inventors | Donald L. Kamm<br>Minnetonka;<br>Gene W. Ross, Minnetonka, Minn. |
|---|---|---|
| [21] | Appl. No. | 825,767 |
| [22] | Filed | May 19, 1969 |
| [45] | Patented | June 28, 1971 |
| [73] | Assignee | Honeywell Inc.<br>Minneapolis, Minn. |

[54] CONTROL APPARATUS
4 Claims, 1 Drawing Fig.

[52] U.S. Cl. ................................................ 209/748,
209/81
[51] Int. Cl. .................................................. B07c 3/02
[50] Field of Search ........................................ 209/73, 74,
75, 81

[56] References Cited
UNITED STATES PATENTS

| 2,448,652 | 9/1948 | Aller | 209/74X |
| 3,198,330 | 8/1965 | Wiesler | 209/74 |

Primary Examiner—Richard A. Schacher
Attorneys—Charles J. Ungemach, Ronald T. Reiling and Albin Medved ABSTRACT: Apparatus for automatically sorting and testing electronic components. The preferred embodiment of the apparatus comprises means for receiving components from an input magazine, positioning each component in a test fixture for automatic testing, and outputting the component into one of a plurality of output magazines dependent on the automatic testing results.

3,587,852
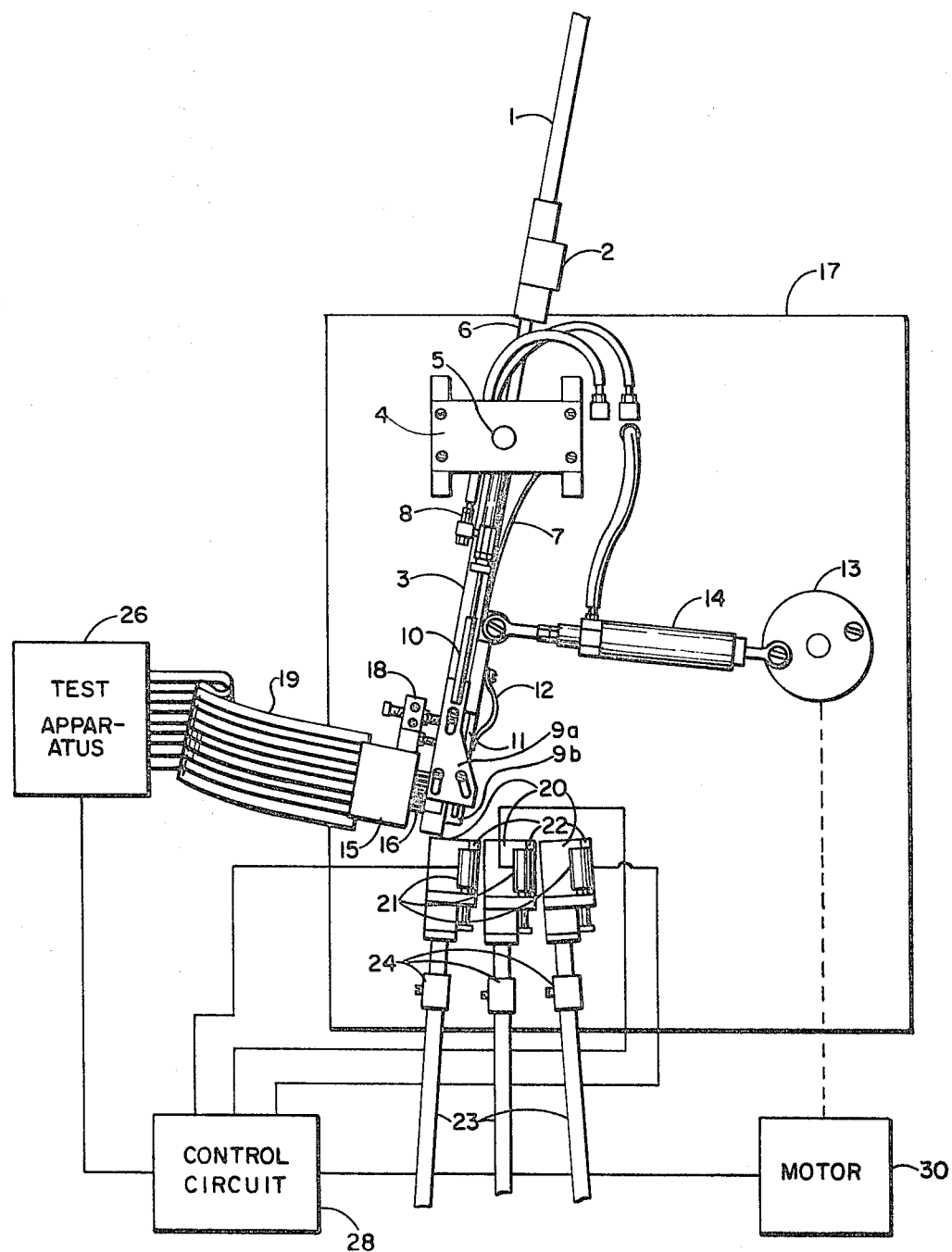
INVENTORS
DONALD L. KAMM
GENE W. ROSS
BY
*Allen Medwed*
ATTORNEY

CONTROL APPARATUS

BACKGROUND OF THE INVENTION

1. Field of the Invention

The present invention pertains to automatic classifying apparatus and, more particularly, to apparatus for handling and sorting electronic components.

2. Description of the Prior Art

Automatic testing devices for complicated electronic components, in particular integrated circuit packages, have been developed. With the advent of automatic testing, the problem in handling large quantities of components has been the placement of the component into a testing position and the subsequent sorting dependent on the testing results. Commonly this has been performed by manual labor with the attendant errors and difficulties connected with any type of human activity.

It is an object of the present invention to provide an improved automatic handling mechanism for electronic components.

It is a further object of the present invention to provide a relatively simple mechanism for transferring components from an input point to a test fixture and subsequently to an output point.

SUMMARY OF THE INVENTION

The preferred embodiment of the present invention accepts in-line integrated circuits from a tube-type magazine input. The integrated circuits are fed to a pendulum distributor. Beach circuit is positioned individually at one extremity of the pendulum where it is held in a preferred orientation. The pendulum is driven by a motor through an extensible arm. The circuit is positioned into a test socket at one end of the pendulum travel.

While in the test connector, the circuit is automatically categorized by automatic testing apparatus. The automatic testing apparatus actuates one of a plurality of accepter magazines, dependent on the characteristics of the particular integrated circuit. Upon completion of the testing, the motor causes the pendulum to swing away from the test connector and sweep through an arc proximate each of the output magazines. A mechanical stop on one of the output magazines is actuated by the test apparatus which causes the pendulum to be halted proximate that receiving fixture. After stopping, the component within the pendulum is released. The circuit is then dropped into the magazine at the output.

BRIEF DESCRIPTION OF THE DRAWING

The single FIGURE of the drawing is a side view of the preferred embodiment of the present invention.

DESCRIPTION OF THE PREFERRED EMBODIMENT

An input parts magazine 1 is positioned in a generally vertical orientation by a releasable clamp 2 mounted on frame 17. A pendulus distributor arm 3 is pivoted about a pin 5 located in a pivot mounting bracket 4 secured to frame 17. The input magazine 1 is connected to the pendulus arm 3 by a pair of flexible strips 6.

The arm 3 carries a pair of air actuated cylinders 8 connected to actuate a pair of sequential gating mechanism 9 through a pair of coupling links 10.

A pivoted clamp arm 11 is held against the arm 3 by a flat spring 12 and is released at the left end of travel by stop 18.

The arm 3 is connected to a revolving hub 13 through an elastic linkage 14.

An electrical test socket 15 is positioned on frame 17 at one end of the pendulus arm 3. A contactor 16 interconnects a component within the arm 3 and the test connector 15. An electrical cable 19 connects the test contactor 15 with a test apparatus 26. The output of test apparatus 26 is connected to a control circuit 28.

A plurality of receiving fixtures 20 are positioned along the perimeter of the arcuate path of the pendulus arm 3. Each of the receiving fixtures 20 has an electrically actuated solenoid 21. The piston of each of the electrically actuated solenoids 21 is connected to a vertically movable gate 22. The solenoids 21 are electrically connected to control circuit 28.

Each of the receiving fixtures 20 has an output magazine 23 held by a releasable clamp 24.

A control circuit 28 is connected to motor 30 which drives hub 13.

The automatic testing apparatus used in the preferred embodiment is a J259 computer operated circuit test system manufactured by Teradyne, Boston, Mass. This particular apparatus utilizes a digital computer interfaced with various analog circuits. The test system may be modified by substitution of different software packages employed to program the digital computer and to assist in preparing input test data.

The apparatus of the preferred embodiment is capable of being assembled with any number of modular units to meet the requirements of a particular device. The output circuitry for the Teradyne tester provides a 16 lamp indication reflecting a decision as a result of testing. Lamps for up to 16 categories are provided.

In the preferred embodiment of the present invention, the signals from these 16 outputs are ANDED together to provide actuation of one of the output magazines depending on the testing result.

OPERATION OF THE PREFERRED EMBODIMENT

Unsorted integrated circuits are stacked in input magazine 1 held by the releasable clamp 2. The inline package is oriented through the entire handling process with the terminals extended toward the contactor 16. The packages are gravity fed through flexible interconnecting linkages 6 into the interior of the channellike pendulum arm 3. The stack of circuits advances down the arm until reaching the region of clamp 11. One circuit is positioned at the end of the pendulum arm 3. The pendulum arm is driven to the left by the motor 30 through the elastic arm 14. The leads of the circuit are joined with the contacts 16 on the test fixture 15 at which time the arcuate movement of the arm 3 is stopped. A testing sequence is initiated which results in actuation of one of the solenoids 21, through control circuit 28, which in turn raises one of the stops 22. The motor 30 is then reactuated causing the arm to sweep to the right until striking one of the stops 22. The motor driven hub 13 continues to rotate with the pendulum arm being held against one of the stops 22. The extensible connection 14 maintains a constant tension on the arm 3. At a predetermined point in the rotation of the hub 13, mechanism 9b releases the circuit being held in the test position. As the arm at this point is directly above one of the receiving fixtures, the circuit is gravity fed into the receiving magazine. Mechanism 9b closes and mechanism 9a opens, advancing the next component into the test position. The motor driven hub 13 continues to rotate which brings the pendulum arm 3 back toward the test connector 15 for testing of the next circuit. Mechanism 9a closes. Upon the arm 3 reaching the test position at the end of travel toward the left, clamp 11 is released by stop 18, allowing the next component to be positioned at mechanism 9b. The testing sequence is then initiated.

The number of receiving assemblies 20 is dependent on the number of categories into which the components are desired to be sorted.

Photoelectric sensors of other proximity sensors may be used in combination with the receiving fixtures 20 to indicate faulty distribution.

The invention is not limited to the use of magazines as input and output devices Continuous feed input and outputs may be used while remaining within the scope of the present invention.

I claim:

1. A sorting apparatus for electronic components, comprising:

input means for delivering unsorted components in a preferred orientation;

a plurality of output means for receiving sorted components;

testing means for classifying said unsorted components according to predetermined test criteria, having an output;

a pendently supported distributor member having;
  means for receiving said unsorted components from said input means,
  guiding means for advancing said unsorted components along a predetermined path from a first location to a second location on said distributor member,
  releasable clamp means for positioning each individual component, as it advances to the second location on said distributor member, into a position for testing, and
  means for releasing each component upon completion of the test;

control driver means, coupled to said distributor member through a flexible linkage, for swinging said distributor member through a predetermined arc proximate said test means and said output means and for operating said releasable clamp means;

stop means associated with each of said output means for stopping said distributor member in a position to release a component, upon completion of the test, into appropriate output means; and control means, connected to the output of said test means, said control driver means and said stop means for operating said distributor member, and said stop means in response to the output of said test means, whereby each of said unsorted components is tested and released into one of said output means in accordance with the output of said test means.

2. Apparatus of claim 1 wherein said input means comprises a vertically oriented magazine for gravity feeding of said components.

3. Apparatus of claim 1 wherein said electronic components are dual in-line integrated circuits.

4. Apparatus for successively transferring a component from an input point to a test point to one of a plurality of output points, comprising:
  frame means;
  distributor means, pivotally mounted to said frame means, for receiving said component from said input point, including controlled clamp means for holding said component in a selected orientation at a point distal from the mounting point;
  a test fixture mounted to said frame means such that movement of said distributor means through an arc about said mounting point brings said component into contact with said test fixture;
  a plurality of receiving fixtures mounted to said frame at points located on the perimeter of said arc, each of said receiving fixtures having a controlled gate for stopping the arcuate movement of said distributor means in a proximate relation to said receiving fixture;
  drive means, mounted to said frame means, for moving said distributor through an arc about said pivot point; and
  control means, interconnected with said test fixture, said drive means, and said controlled gate for actuating said drive means to move said component clamped within said distributor means into position with said test fixture, actuating one of said controlled gates, actuating said drive means to move said distributor means through an arc against said controlled gate, and releasing said controlled clamp means allowing transfer of said component from said distributor means to said receiving fixture.